United States Patent [19]
Abe et al.

[11] Patent Number: 5,338,421
[45] Date of Patent: Aug. 16, 1994

[54] METHOD OF AND APPARATUS FOR SEPARATION BY AGGLOMERATION

[75] Inventors: Naoki Abe, Okazaki; Fumio Kawahara, Toyota; Noboru Inoue, Osaka, all of Japan

[73] Assignees: Toyota Jidosha Kabushiki Kaisha; MEC International Corporation, both of Toyota; Zeotek LRC Corporation, Osaka, all of Japan

[21] Appl. No.: 100,170

[22] Filed: Aug. 2, 1993

[30] Foreign Application Priority Data

Aug. 7, 1992 [JP] Japan .................................. 4-211850
Jul. 8, 1993 [JP] Japan .................................. 5-169008

[51] Int. Cl.$^5$ ............................................. C02F 1/463
[52] U.S. Cl. ........................... 204/186; 204/188; 204/191; 204/275; 204/302
[58] Field of Search ............... 204/149, 186, 188, 191, 204/302, 275

[56] References Cited

U.S. PATENT DOCUMENTS

| | | | |
|---|---|---|---|
| 4,033,851 | 7/1977 | Oros | 204/302 |
| 4,391,698 | 7/1983 | Wagner | 204/302 |
| 4,409,078 | 10/1983 | Wagner et al. | 204/188 |
| 4,602,989 | 7/1986 | Culkin | 204/180.1 |

FOREIGN PATENT DOCUMENTS 58-156309  9/1983  Japan .
4-59002    2/1992  Japan .

*Primary Examiner*—John Niebling
*Assistant Examiner*—Arun S. Phasge
*Attorney, Agent, or Firm*—Oliff & Berridge

[57] ABSTRACT

A method of separating an aqueous colloidal solution by agglomeration into water and agglomerate of colloidal particles by applying voltage to the aqueous colloidal solution to promote the agglomeration of colloidal particles. The frequency of the voltage to be applied to the aqueous colloidal solution is increased to about 10 kHz to improve efficiency of agglomeration and suppress electrolysis of water. As the frequency is increased, hydrogen is generated earlier than the reaction of oxygen generated by the electrolysis of water with the colloidal particles, thus not oxidizing the colloidal particles. Further, as the frequency is increased, the colloidal particles tend to obtain a greater oscillation energy, thus facilitating the agglomeration thereof.

7 Claims, 6 Drawing Sheets

METHOD OF AND APPARATUS FOR SEPARATION BY AGGLOMERATION

BACKGROUND OF THE INVENTION

1. Field of the Invention

This invention relates to a method of and an apparatus for separating water and agglomerate of colloidal particles in an aqueous colloidal solution with colloidal particles dispersed in liquid mainly composed of water, such as alkali washing liquid with oil dispersed in water in the form of oil-drop-in-water emulsified particles in water. By the term "colloidal particles" is meant either or both of liquid particles (i.e., emulsified particles) and solid particles (i.e., hydrophobic colloidal particles). By the term "agglomeration" is meant gathering of particles into a greater particle. Where colloidal particles are dispersed in an aqueous solution, by the term "separation to water and colloidal particles" is meant separation to aqueous solution and agglomerate of colloidal particles.

2. Prior Art

It is well known in the art that a system in which water is dispersed in oil can be separated into water and oil with application of a voltage to the system, as disclosed in, for instance, U.S. Pat. Nos. 4,391,698 and 4,409,078. These prior art literatures also disclose a technique of applying an AC voltage and also that efficient separation is obtainable with application of a voltage of 2 to 100 KV at a frequency of 60 to 1,500 Hz. Similar techniques are also disclosed in Japanese Laid-Open Patent Publication No. 58-156309. In this technique, commercial power of 60 to 120 V (at 50 to 60 Hz) is applied to colloidal solution.

The above disclosed techniques are for processing systems in which water is dispersed in solution mainly composed of oil. Oil has low electric conductivity compared to water, and current caused through oil is low even by applying comparatively high voltage. Besides, there is no problem of electrolysis of oil content. Thus, efficient separation is obtainable by application of comparatively high voltage.

However, where oil or the like is dispersed in water, current is readily caused because water has high electric conductivity compared to oil. Therefore, if the voltage applied is increased to promote the separation, a high voltage high current is caused to result in shortage of the capacity of the power source. Besides, because of the high current caused, electrolysis of water takes place. When the electrolysis of water occurs, colloidal particles of oil or the like are oxidized by oxygen that is generated, so that they can not be recovered in a satisfactory state. At present, therefore, a method of separation of an aqueous colloidal solution to water and colloidal agglomerate with voltage application does not provide for satisfactory results.

SUMMARY OF THE INVENTION

An object of the invention is to provide a method of promoting the separation of an aqueous colloidal system mainly composed of water by applying a voltage to the system, which permits satisfactory separation results to be obtained and also permits substantial suppression of the electrolysis of water.

To attain the above object, the invention provides a method of separating an aqueous colloidal solution into water and agglomerate of colloidal particles by promoting the agglomeration of colloidal particles in the solution, which at least comprises the steps of accommodating the aqueous colloidal solution in a tank provided with a pair of electrodes and then applying a high frequency voltage between the pair electrodes, the frequency of the high frequency voltage being set to be at least a frequency at which polarity inversion occurs earlier than generation period oxygen generated with energization reacts with the colloidal particles.

The voltage of the high frequency voltage is set to be no higher than a voltage at which the substantial electrolysis of water is suppressed. The substantial electrolysis of water refers to electrolysis that proceeds during a time interval of one cycle or more of the high frequency voltage.

Desirably, an insulator is interposed between electrodes such that the current flowing through the aqueous colloidal solution is lower than the substantial water electrolysis suppression current.

Also, the invention provides an apparatus for separation by agglomeration, which is for carrying out the method according to the invention and which comprises a tank for accommodating an aqueous colloidal solution, at least one pair of electrodes disposed in the tank, and a power source for applying a high frequency voltage between the electrodes, the frequency of the power source being at least a frequency at which polarity inversion occurs earlier than the reaction of generation period oxygen generated by energization of the system with the colloidal particles.

When a voltage is applied between the electrodes, electrolysis of water is caused. If the applied voltage is an AC voltage, whenever the polarity of the voltage is inversed, oxygen and hydrogen are generated alternately from one electrode. If the frequency is one as used in the prior art, i.e., of the order of several 10 Hz to 1 kHz, the generated oxygen is reacted with colloidal particles, thus disabling recovery thereof in a satisfactory state. However, as the frequency is further increased, oxygen and hydrogen are generated alternately in a very short period of time, and eventually hydrogen is generated earlier than the reaction of the generated oxygen with colloidal particles, thus making the reaction between oxygen and colloidal particles difficult. Consequently, a state substantially free from the electrolysis of water is obtained. This phenomenon was discovered by the inventor, and the present invention is predicated on this discovery.

More specifically, if the frequency of the high frequency voltage is set to be above a frequency at which polarity inversion occurs earlier than the reaction of generation period oxygen generated by energization with colloidal particles, voltage application to colloidal particles is possible with the electrolysis substantially suppressed, thus lowering the surface potential on the colloidal particles and facilitating the agglomeration thereof.

Further, if the voltage is set to be no higher than the substantial water electrolysis suppression voltage, the substantial electrolysis of water is suppressed. Besides, even under this condition, the agglomeration proceeds smoothly.

Further, with an insulator provided between the electrodes to suppress current through the colloidal solution, the electrolysis of water can be suppressed effectively.

Further, with an apparatus which comprises a tank, electrodes and a power source and in which the power source frequency is set to be at least a frequency at which the polarity inversion occurs earlier than the reaction of generation period oxygen generated with energization with colloidal particles, the agglomeration of colloidal particles proceeds rapidly in a state in which the substantial electrolysis of water is suppressed.

DETAILED DESCRIPTION OF THE PREFERRED EMBODIMENTS

Some preferred embodiments of the invention will now be described.

FIRST EMBODIMENT

Figure 1:
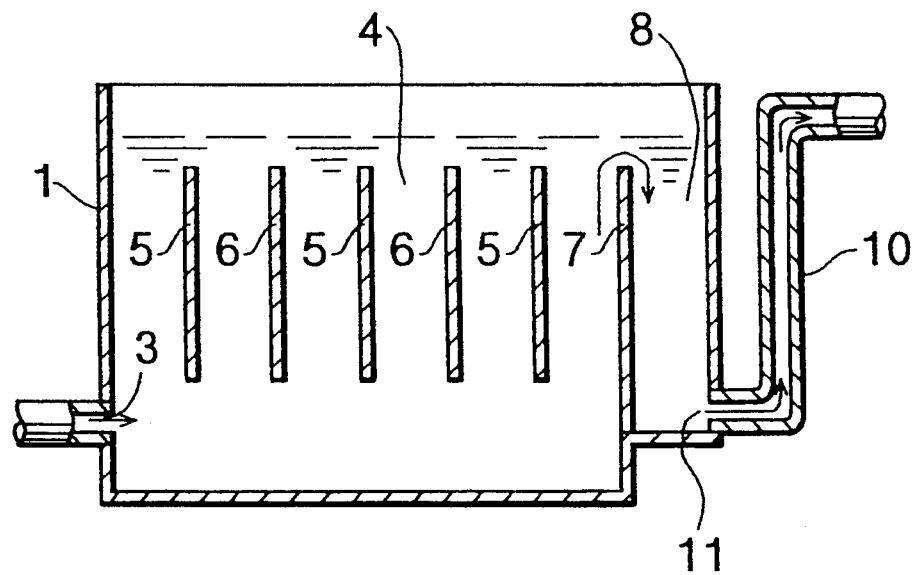
FIG. 1 is a vertical sectional view showing a first embodiment of the apparatus for separation by agglomeration.
Figure 2:
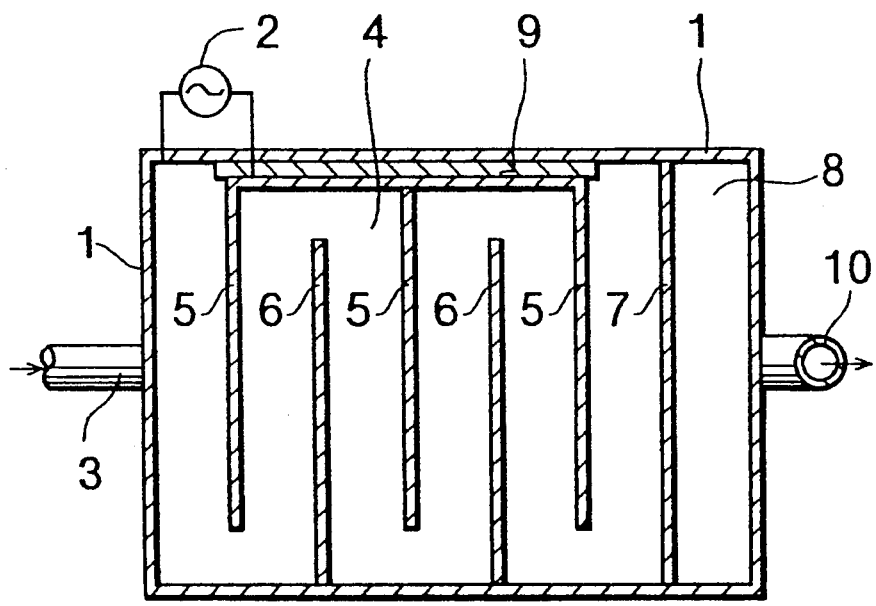
FIG. 2 is a transverse sectional view showing the same apparatus.

FIG. 1 is a vertical sectional view showing a first embodiment of the apparatus for separation by agglomeration, and FIG. 2 is a transverse sectional view of the same apparatus. The apparatus comprises a tank 1, electrode plates 5 and 6 disposed in the tank 1 and a power source 2 for applying a high frequency voltage between the electrodes 5 and 6 to apply an electric field to the process liquid.

The tank 1 has a wall provided with a supply port 3 for supplying process liquid thereto. A supply tube is connected to the supply port 3. An electrode chamber 4 is defined in the tank 1 near the supply port 3. In the electrode chamber 4, a plurality of opposite polarity electrode plates 5 and 6 are arranged alternately in a vertical row.

The electrode plates 5 are secured via an insulating plate 9 to a wall of the tank 1, while the electrode plates 6 are secured directly to the tank 1. Thus, the wall of the tank 1 is held at the same potential as the electrode plates 6. Thus, in the embodiment of FIGS. 1 and 2, six electrode pairs are formed in the tank 1. Adjacent the free ends of the electrode plates 5 and 6, a space is formed which serves as a process liquid passage. In a bottom portion of the electrode chamber 4 in the tank 1, a space is formed for collecting an agglomerated precipitate. The electrode plates 5 and 6 are made of iron, aluminum or like conductive metal.

Adjacent the electrode chamber 4, a partitioned chamber 8 is defined by a partitioning plate 7 extending from the bottom of the tank 1 and having a small height. Process liquid after separation overflows from the electrode chamber 4 over the partitioning plate 7 into the partitioned chamber 8.

The end wall of the tank 1, i.e., a wall of the partitioned chamber 8, has a lower portion formed with an out-flow port 11. An out-flow duct 10 is connected to the out-flow port 11. The out-flow duct 10 rises from the out-flow port 11 up to the liquid level, and overflown process liquid flows out from the liquid level.

Figure 3:
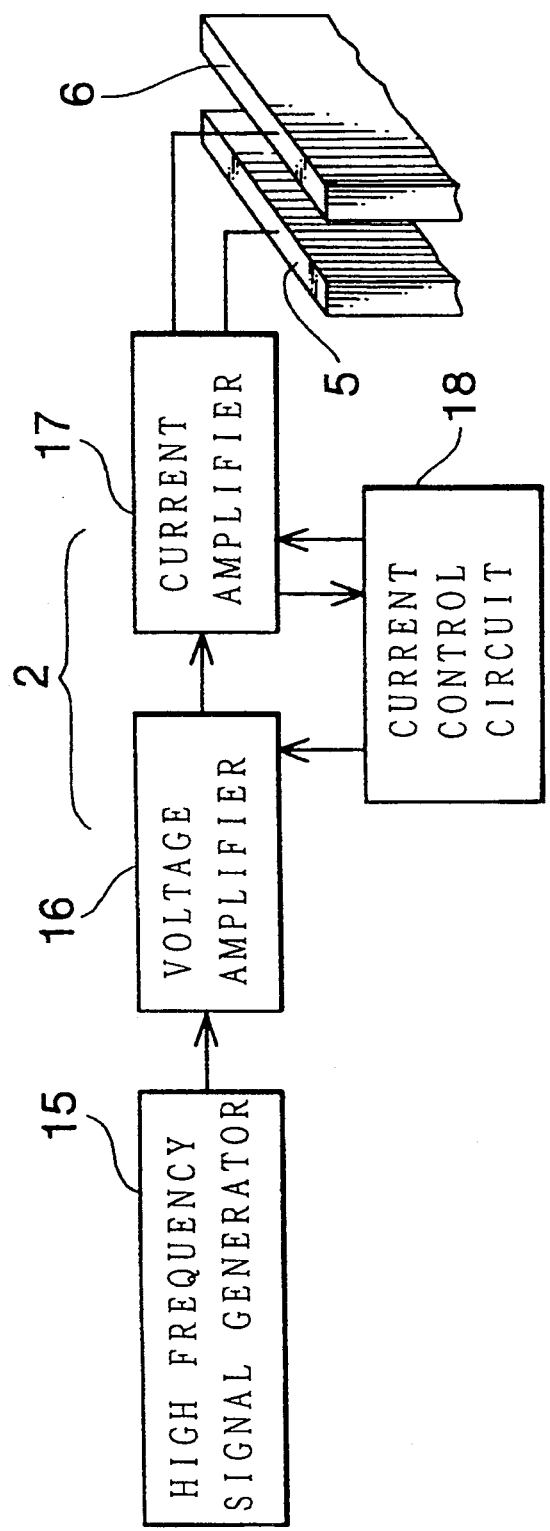
FIG. 3 is a block diagram showing a power source.

As shown in FIG. 3, the power source 2 includes a high frequency signal generator 15 for generating a high frequency signal, a voltage amplifier 16 for receiving and voltage amplifying a high frequency signal outputted from the high frequency signal generator 15, a current amplifier 17 for current amplifying the signal outputted from the voltage amplifier 16, and a current control circuit 18. The output side of the current amplifier 17 is connected to the electrode plates 5 and 6 in the electrode chamber The high frequency signal generator 15 includes a high frequency oscillator for generating a high frequency signal at about 1 to about 500 kHz, and it can output a frequency signal at a frequency which can be set as desired. The high frequency signal generator 15 includes a sinusoidal, a rectangular and a sawtooth wave output circuit for outputting a sinusoidal, a rectangular and a sawtooth wave, respectively, as high frequency signal of oscillation. These output circuits are capable of being switched over to one another to output the high frequency wave signal having the selected waveform.

When waste liquid or like process liquid is put into the tank 1 and agglomeration processed by applying an electric field, the conductivity of the liquid is changed with the progress of agglomeration of particles. Due to the conductivity changes, the current flowing between the electrode plates 5 and 6 is deviated from the current value corresponding to the best agglomeration efficiency. Accordingly, the current control circuit 18 is provided for controlling the output current from the current amplifier 17.

The current control circuit 18 detects the output current from the current amplifier 17 and compares the detected current to a preset current value. If the compared current values are different, the circuit 18 outputs a voltage regulation signal to the voltage amplifier 16 for voltage regulation to match the output current of the current amplifier 17 to the preset current value. The current amplifier 18 also serves as a protection circuit for cutting the output of the current amplifier 17 in the event of abnormal rise of the load current due to a short-circuit between electrodes or like cause.

In operation, waste liquid (with fine solid particles dispersed therein) discharged from a washing step in the coating step, for instance, is supplied through a pump or the like and the supply port 3 into the electrode chamber 4 in the tank 1. An agglomerate separation process is started by starting the power source 2 and thus applying a predetermined high frequency voltage between the electrode plates 5 and 6.

The frequency of the high frequency voltage applied between the electrode plates 5 and 6 is set to be above a frequency at which polarity inversion takes place earlier than the oxidization of the minute solid particles dispersed in the liquid by generation period oxygen generated by the energization. Since the frequency varies with the kind of the liquid and particles, it is determined by experiments in advance.

An example of experiment will now be described. Three different dispersing media for colloidal solution, i.e., 0.01, 0.1 and 1% aqueous solutions of sodium sulfide, were prepared. Also, the distance between the electrode plates 5 and 6 was set to 15 mm, and a voltage of 20 volts was applied between the electrodes. Then, potassium iodide and starch solution was added to the tank, and a check was done as to whether oxygen is generated by electrolysis of water and acts on iodine to cause an iodine starch reaction. This check substantially permits a check as to whether electrolysis takes place.

By applying 60 Hz between the electrodes 5 and 6, clear coloring was recognized with all the solutions (of 0.01, 0.1 and 1%). By increasing the frequency, the coloring was still recognized at 600 and 1,000 Hz although there was a trend for color shading. When the frequency was increased up to 10 kHz, the coloring was no longer recognized at all with all the solutions (of 0.01, 0.1 and 1%). More specifically, with application of a high frequency voltage at 10 kHz or above, hydrogen was generated earlier than a reaction taking place between the generated oxygen and iodine, the generated hydrogen prohibiting the reaction between the oxygen and iodine.

Thus, where the dispersing medium is sodium sulfide aqueous solution, by applying a high frequency wave at 10 kHz or above, it is possible to cause an electric field to act on colloidal particles in a state that the oxidization of these particles is suppressed. The substantial electrolysis suppression frequency varies with the character of the liquid and colloid. Specifically, a frequency of 1 kHz as applied in the prior art is insufficient, and sufficiently higher frequency has to be applied.

Figure 4:
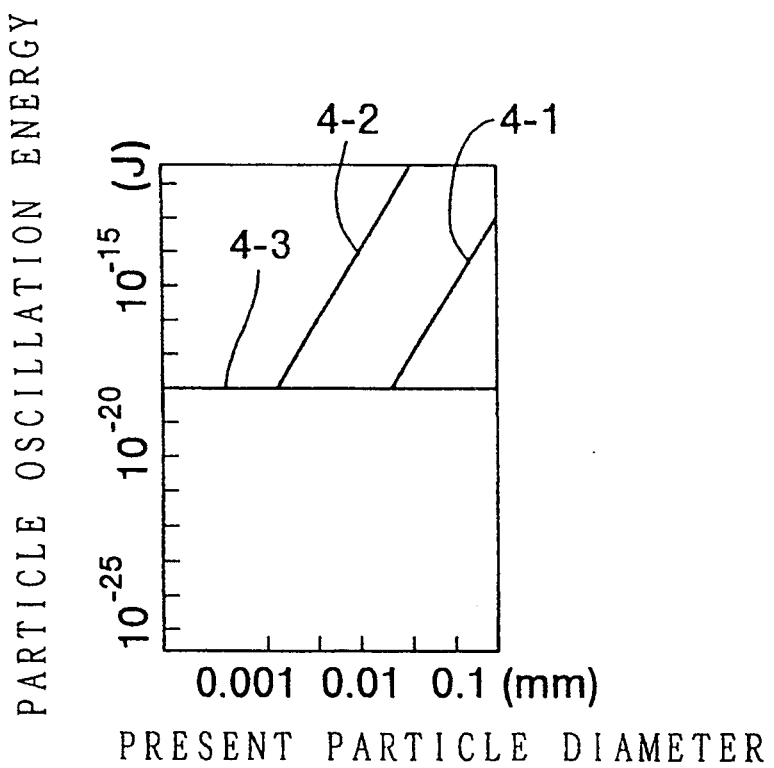
FIG. 4 is a graph showing the relationship among the oscillation energy, repulsive energy, particle diameter and frequency.

By applying a frequency of 10 kHz, the colloidal particles are oscillated at 10 kHz. The inventors confirmed, as a result of observation of particles with an optical microscope, a phenomenon that the particles oscillate in the direction of voltage application. As a result of the oscillation, the particles acquire oscillation energy. FIG. 4 shows the oscillation energy for which the ordinate is taken, while taking the abscissa for the particle diameter. This oscillation energy is in a case when the oscillation amplitude is 1/10 of the particle diameter. The higher the oscillation energy is the higher the higher the frequency is. A plot 4-1 in FIG. 4 is for oscillation at 60 Hz, and a plot 4-2 for oscillation at 60 kHz.

Shown at 4-3 is the level of repulsive energy of particles. When the oscillation energy of particles surpasses the repulsive energy, the particles can be agglomerated. As is seen from FIG. 4, at a frequency of 60 Hz, the agglomeration can not be obtained unless the particle diameter is 0.01 mm or above, whereas at a frequency of 60 kHz particles greater than 0.001 mm can be agglomerated.

According to the invention, a frequency at which substantial electrolysis of water is suppressed is used, and thus the agglomerating capacity can be improved at the same time.

Figure 5:
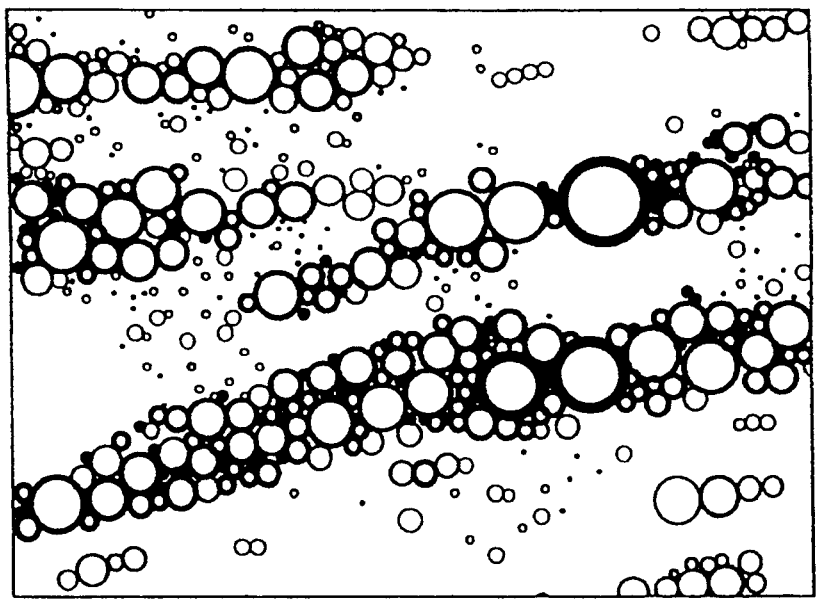
FIG. 5 is a view showing an example of agglomerated particle groups.

FIG. 5 shows the result of actual observation of agglomerated particles as a result of the process in this embodiment. In FIG. 5, to the left and right are directions of voltage application. It is recognized that particles oscillated in transverse directions and that the duel structure of boundary electricity in the transverse position of the individual particles is neutralized to obtain progressive agglomeration of particles in the voltage application directions.

As shown above, in this embodiment the particles acquire high oscillation energy and are readily agglomerated with neutralization of the dual structure of the boundary electricity. Further, it is possible to obtain a phenomenon that metal ions flowing out from the electrode plates 5 and 6 react with hydroxide ions in the liquid to form flocks which are precipitated by trapping particles.

The process liquid after separation of particles, overflows over the partitioning plate 7 into the partitioned chamber 8 and thence flows out through the out-flow duct 10. The agglomerated precipitate in the bottom of the electrode chamber 4 is discharged in a suitable way after the process.

Where the process liquid is a water-soluble cutting or washing liquid, a great amount of surface active agent is contained together with oil component in the liquid which is mainly composed of water, the oil component being contained as emulsion, i.e., as minute oil drops. When this liquid is put into the tank 1 and a high frequency voltage is applied, the dynamic potential on the interface of the oil component in the liquid is neutralized by the electric field to promote agglomeration of the oil drops. As a result, the separated oil is floated up in the electrode chamber 4 to form a high oil concentration surface layer, while the lower layer is substantially oil free water, thus obtaining the separation of the process liquid. Thus, even oil component in an emulsified waste liquid can be separated efficiently by agglomeration separation.

EXPERIMENT EXAMPLE

To confirm the effects of the above embodiment, an emulsified sample waste liquid was produced by adding four liters of oil in 90 liters of commercially available alkali washing solution, and was subjected to an agglomeration separation process in the present apparatus by applying a high frequency voltage of 60 kHz. After the process, the amount of hexane extract from the sample was measured.

Table 1 shows the result of measurement. The measurement was carried out in conformity to JIS-K0102 (24-2). The table also shows the result of measurement in a comparative example in which a commercial AC electric field at 60 Hz was applied to the sample waste liquid.

TABLE 1

| | Hexane extract quantity (mg/liter) | |
|---|---|---|
| Number of times of circulatory process | Experiment example (frequency of electric field: 60 kHz) | Comparative example (frequency of electric field: 60 Hz) |
| 0 | 16,000 | 16,000 |
| 6 | 10,000 | 13,000 |
| 12 | 9,000 | 11,000 |
| 24 | 7,800 | 11,000 |
| 72 | 7,000 | 11,000 |

From the above experiment, it will be seen that when agglomeration separation is carried out with the embodiment of the apparatus by applying a high frequency voltage, a greater amount of oil component can be removed by separation from the sample liquid compared to the case of applying a commercial AC power source voltage.

As for the current and voltage of high frequency power applied to the waste liquid, with a waste liquid containing solid particles, the best result of agglomeration separation solid particles, the best result of agglomeration separation could be obtained by applying a high frequency wave power to the electrode plates such that the frequency was 60 kHz, the current was 0.9 A and the voltage was 20 V. Further, with a waste liquid containing emulsion, the best result of agglomeration separation could be obtained by applying high frequency power to the electrode plates such that the frequency was 60 kHz, the current was 1.0 A and the voltage was 20 V.

SECOND EMBODIMENT

Figure 6:
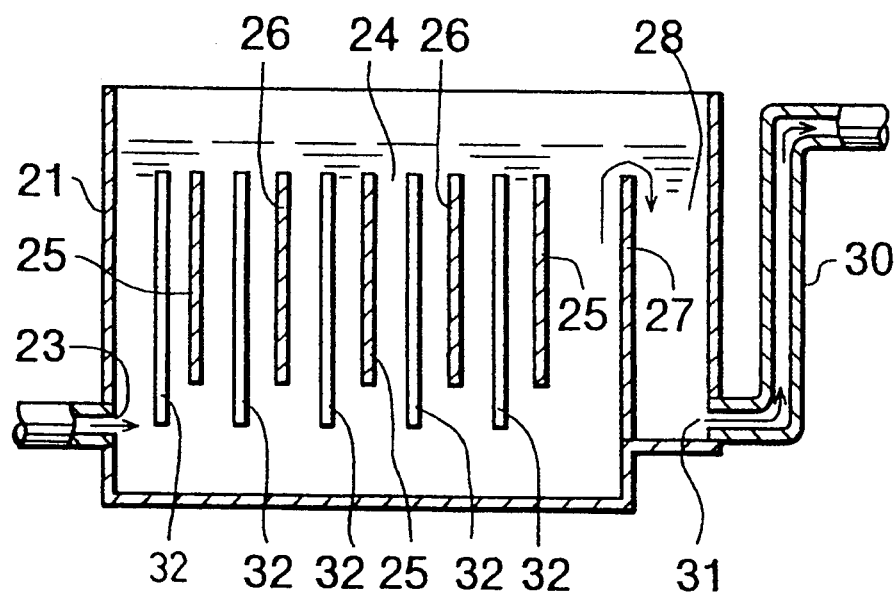
FIG. 6 is a vertical sectional view showing a second embodiment of the apparatus for separation by agglomeration.
Figure 7:
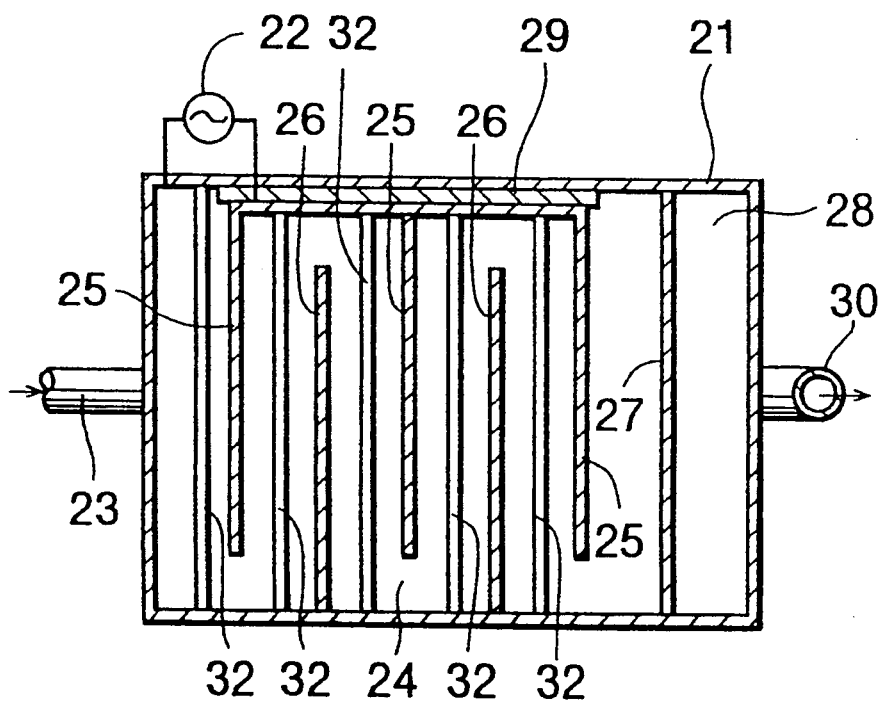
FIG. 7 is a transverse sectional view showing the same apparatus.

FIGS. 6 and 7 show a second embodiment of the apparatus. In this instance, an insulator 32 is disposed between paired electrode plates 25 and 26, the remainder of the structure being the same as in the preceding first embodiment.

With the insulator 32 interposed between adjacent electrode plates, the arrangement makes the flow of current difficult, thus promoting the suppression of the electrolysis, that is, electrolysis does not occur when a higher voltage is applied. Actually, in this embodiment no electrolysis was recognized when a voltage of 50 volts was applied between the electrode plates 25 and 26.

Figure 8:
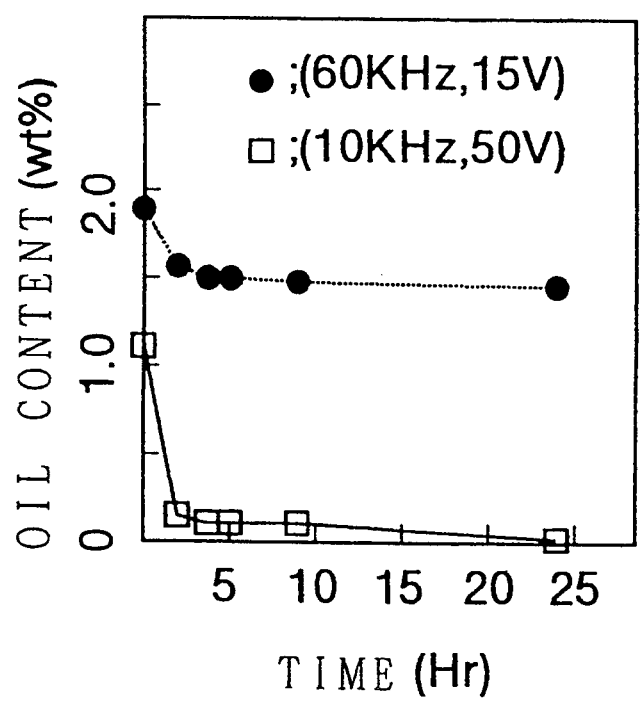
FIG. 8 is a graph showing the result of process carried out with the second embodiment.

FIG. 8 shows results in examples in which a voltage of 50 volts at 10 kHz and a voltage of 15 volts at 60 kHz were applied to this embodiment of the apparatus. In the graph, the ordinate is taken for the oil content (in % by weight), and the abscissa is taken for the process time. Although it seems that superior agglomeration performance is obtainable with the higher frequency of 60 kHz, actually the voltage has stronger influence, and it was confirmed that superior agglomeration was obtainable with the higher voltage despite the lower frequency. It was estimated that with an increase of voltage the oscillation amplitude is increased to increase the oscillation energy for promoting the agglomeration. It is expected that superior result is obtainable by applying 50 volts at 60 kHZ.

In this case, due to the presence of the insulator 32, no great current flows even by applying a high voltage between the electrodes. This means that the power source capacity may be low, and nevertheless the apparatus is advantageously used for the suppression of electrolysis.

THIRD EMBODIMENT

Figure 9:
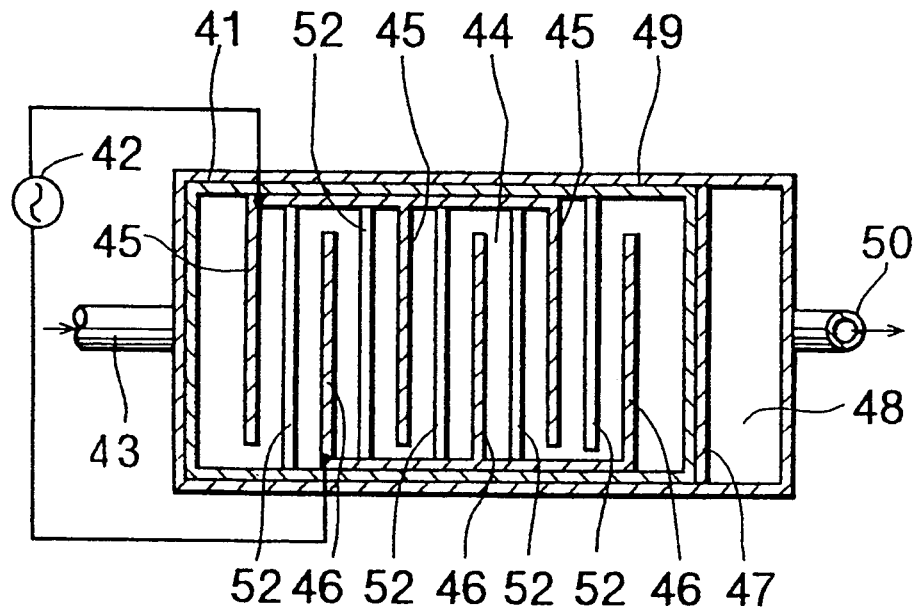
FIG. 9 is a transverse sectional view showing a third embodiment of the apparatus for separation by agglomeration.

While the preceding first and second embodiments used the tank wall as electrode, it is possible to insulate the inner surface of tank 4 with an insulator 49, as shown in FIG. 9, thus perfectly insulating electrode plates 45 and 46 from one another.

FOURTH EMBODIMENT

Figure 10:
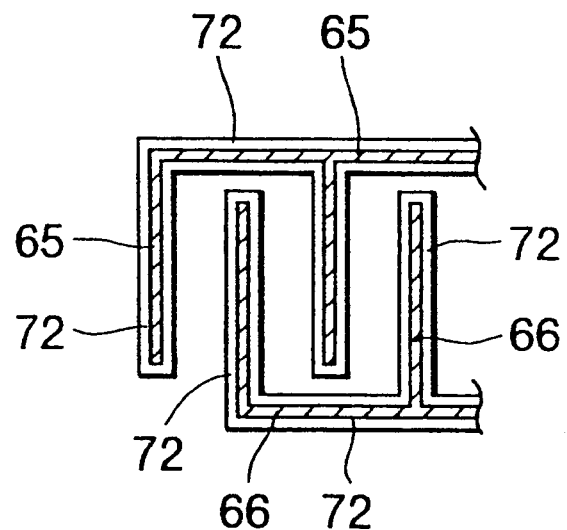
FIG. 10 is a transverse sectional view showing electrode plates according to a fourth embodiment of the invention.

According to the invention, the colloidal solution may not be energized. When an electric field is applied to colloidal solution, the particles therein is oscillated to promote electrically neutral state so as to promote the agglomeration. In the fourth embodiment, as shown in FIG. 10, electrode plates 65 and 66 are perfectly insulated by coating an insulator 72 on their surfaces. With this arrangement, the electrolysis of water is suppressed, thus permitting efficient agglomeration by application of a high voltage.

In either of the above embodiments, a comparatively low voltage is applied between electrodes. Thus, the electrolysis of water hardly takes place. Besides, since a high frequency voltage is utilized, the electrolysis of water substantially does not take place.

As has been shown in the foregoing, according to the invention the agglomeration of colloidal particles is promoted in a state that the electrolysis of water is suppressed. It is thus possible to obtain efficient agglomeration and separation of particles from a system in which the particles are dispersed in a dispersing medium mainly composed of water. The invention thus can contribute greatly to the safeguarding of the environments and re-use of resources.

What is claimed is:

1. A method of separating an aqueous colloidal solution into water and an agglomerate of colloidal particles comprising the steps of:
    accommodating said aqueous colloidal solution in a tank, the tank having at least one pair of electrodes; and
    agglomerating said colloidal particles by applying a high frequency voltage between the electrodes of each pair of electrodes, a frequency of said high frequency voltage being at least a frequency at which polarity inversion occurs, said polarity inversion occurring earlier than a reaction of generation period oxygen with said colloidal particles.

2. The method of separation of claim 1, wherein a voltage of said high frequency voltage is at most a substantial water electrolysis suppression voltage.

3. The method of separation of claim 1, wherein the frequency of said high frequency is greater than an electrolysis suppression frequency.

4. The method of claim 3, wherein the frequency of said high frequency voltage is greater than 50 kHz.

5. A method of separating an aqueous colloidal solution into water and an agglomerate of colloidal particles comprising the steps of:
    accommodating said aqueous colloidal solution in a tank, the tank having at least one pair of electrodes, wherein a corresponding intervening insulator is provided between each electrode of each pair of electrodes; and
    applying a high frequency voltage between the electrodes of each pair of electrodes, wherein a frequency of said high frequency voltage is at least a frequency at which polarity inversion occurs, said polarity inversion occurring earlier than a reaction of generation period oxygen with said colloidal particles, wherein each insulator is disposed to limit a current flowing through said aqueous colloidal solution to less than a substantial water electrolysis suppression current.

6. An apparatus for separating an aqueous colloidal solution into water and an agglomerate of colloidal particles, the apparatus comprising:
    a tank accommodating said aqueous colloidal solution;
    at least one pair of electrodes disposed in said tank; and
    agglomerating means for agglomerating said colloidal particles by applying a high frequency voltage between the electrodes of each pair of electrodes, wherein a frequency of said agglomerating means is at least a frequency at which polarity inversion occurs, the polarity inversion occurring earlier than a reaction of generation period oxygen with said colloidal particles.

7. The apparatus of claim 6, further comprising a corresponding insulator disposed between the electrodes of each pair of electrodes, wherein each insulator is disposed to allow a current flowing through the aqueous colloidal solution to be less than a substantial water electrolysis suppression current.

* * * * *